United States Patent [19]
Collins

[11] 3,913,677
[45] Oct. 21, 1975

[54] TREATMENT OF OIL WELL STRATA

[75] Inventor: Dwight D. Collins, Bakersfield, Calif.

[73] Assignee: Chemsoil Corporation, Bakersfield, Calif.

[22] Filed: Aug. 6, 1973

[21] Appl. No.: 385,887

[52] U.S. Cl. .................................................. 166/307
[51] Int. Cl.² ........................................ E21B 43/24
[58] Field of Search ........... 166/271, 300, 311, 270, 166/280, 305 R, 307

[56] References Cited
UNITED STATES PATENTS

| | | | |
|---|---|---|---|
| 2,764,465 | 9/1956 | Rohrback et al. | 166/300 |
| 3,063,499 | 11/1962 | Allen | 166/280 |
| 3,326,289 | 6/1967 | Mulder | 166/271 |
| 3,353,597 | 11/1967 | Mulder | 166/271 X |
| 3,398,791 | 8/1968 | Hurd | 166/270 |
| 3,532,165 | 10/1970 | Raifsnider | 166/270 |

*Primary Examiner*—Stephen J. Novosad
*Attorney, Agent, or Firm*—Donald D. Mon

[57] ABSTRACT

A method of treating oil-bearing strata in oil wells. Water is treated by absorbing in it sulfur dioxide in excess of the stoichiometric amount needed to remove any elementary oxygen from said water preferably using iron as a catalyst, and also to remove all carbonates and bicarbonates therefrom, and thereafter without exposing the treated water to oxygen or air injecting the treated water into the strata. In some strata, in which calcium compounds are not present, an opening up of clays to flow can be provided by adding to the water a calcium compound which is reactive with sulfurous acid to form calcium sulfite or calcium bisulfite (preferably the latter), whereby to provide a calcium ion for exchange with the sodium ion in the clay.

7 Claims, No Drawings

TREATMENT OF OIL WELL STRATA

This invention relates to a method for treating oil-bearing strata in oil wells which, as a consequence of production, have become plugged. A common cause of plugging of oil wells is the deposition in the strata of water-insoluble calcium salts, principally calcium carbonate, and by the formation of sodium clays in the absence of calcium ion.

It is well known that the production of many oil wells decreases over a period of time as a consequence either of the formation of sodium clays which swell up and become less pervious to flow in the absence of calcium ion, or as a consequence of the formation of water-insoluble calcium carbonate. Calcium carbonate generally is formed in calcium-bearing strata from water which flows toward the well casing, near which it becomes less soluble as a consequence of a reduction in pressure near the casing and is deposited in the strata. It is not unusual for such wells to become substantially impervious to oil flow over a period of time. The literature is replete with means for reopening such strata to the flow of oil. Fundamentally, it is necessary either to reduce the swelling of the clays in the absence of calcium or to remove the calcium carbonate as the case may be.

The acid treatment of wells is known, but in general, this technique has only limited utility for the reason that the acids utilized, usually sulfuric or phosphoric acids, cause inadmissably high rates of corrosion of the well casing. Accordingly, only relatively small quantities of acid can be made available to the strata, and these quantities are usually less than are necessary fully to open up the formation to flow. Even then, corrosion is often excessive.

Because the wells are plugged up near the casing, it is possible to inject only a relatively small quantity of water into the wells, at least at first, so that a high concentration of reactant acid is desirable. However, with the use of common highly dissociated acids for this purpose (such as sulfuric acid) to inject a sufficient quantity of reactant will involve such extremely high acidity that the well itself will be damaged.

It is an object of this invention to provide a method for treating oil-bearing strata in which a substantial quantity of reactant acid can be injected into the strata without an impermissible level of acidity being reached, whereby for a given quantity of water injected into the wells, a surprisingly improved result can be expected. Simultaneously, with the use of this invention, oxygen can be scavenged from this water, further reducing the corrosion in the wells.

In soils which are deficient in calcium, and wherein the sodium reacts with clays to swell up and close the formations, it is possible with the use of this invention to provide a calcium ion substituent for the sodium ion, thereby unplugging such formations.

The method of this invention is carried out by treating water by means of absorbing in it sulfur dioxide in excess of the stoichiometric amount needed to remove any elementary oxygen from the water, and to remove all bicarbonates and carbonates from the water, and thereafter, without exposing the treated water to oxygen or to air, injecting the treated water into the strata.

As an optional feature of the invention, when it is desired to provide a calcium ion for exchange in sodium clays, a calcium compound, for example, calcium carbonate, reactive with sulfurous acid to form calcium sulfite or calcium bisulfite is added to the treated water, or calcium bisulfite or calcium sulfite is added directly to the treated water for this purpose.

In the accomplishment of this invention, sulfur dioxide may readily be obtained by the use of well known burners which burn sulfur in air. One device which is suitable for use with this method is shown in Mattson U.S. Pat. No. 3,627,134, issued Dec. 14, 1971, entitled "Water Treatment Device." Any other source of sulfur dioxide could be used instead, including bottles of sulfur dioxide gas. However, sulfur-burning devices such as that shown in the Mattson patent have simple controls, and are rugged and portable. They comprise an economically excellent source of sulfur dioxide gas for use in this process, and a good means for absorbing it in water. The term "absorption" as used herein includes the creation of both a true solution of sulfur dioxide in water, as well as its reaction with water to form sulfurous acid. It is theorized that the primary substance produced by injection of $SO_2$ into water is $H_2SO_3$, which, over a period of time in the presence of oxygen, may react to form $H_2SO_4$. It is this latter reaction which results in the removal of elementary oxygen from the water.

Accordingly, in this invention water to be injected into oil well strata has injected into it sulfur dioxide in excess of the stoichiometric amount required to remove any elementary oxygen from said water. As stated, this removal is a consequence of the oxidation of sulfurous acid to sulfuric acid. Also, the sulfur dioxide will be provided in quantities stoichiometrically in excess of that needed to remove all bicarbonates and carbonates from said water by reacting with them so as to emit carbon dioxide and to form a sulfite or bisulfite. The excess sulfur dioxide will be utilized in the reaction in the well. Oxygen and air are kept away from the treated water to avoid generation of additional sulfuric acid.

The amount of sulfur dioxide to be injected will depend on the desired pH. In general, it is undesirable to have the acidity much above pH 1.8 (a lower-number pH), and best reactions occur generally with the acidity above pH 7.0 (a lower-number pH than 7.0). Depending on conditions such as the coating of oil on the oil well casing, the acidity may be greater than this range, and depending also upon the substances to be reacted in the strata, the acidity may be less than 7.0, although these circumstances will be relatively rare.

Because the oxygen is removed from the water, and because the concentration of sulfuric acid derived from oxidation by elementary oxygen in the water will be relatively low, and because the acidity of the treated water, even with substantial concentration of sulfurous acid will be relatively low, the water can be injected at relatively high temperatures. Depending upon the pressures utilized, the treated water may be maintained at the well head in the range between about 50° and 280° F. The temperature at the strata will, of course, vary depending upon conditions down the well hole.

Because the dissociation of sulfurous acid differs remarkably from that of sulfuric acid, and is a relatively buffered solution, there will be a remarkably greater concentration of sulfurous acid required to produce the same acidity as there would be in the case of sulfuric or phosphoric acids. Accordingly, with the use of sulfurous acid, a greater amount of reactant can be introduced to the strata at the bottom of the well per unit volume of water than with conventionally used acids, and often at a lower acidity (higher pH number) which will be far less damaging to the casing. Accordingly, more frequent and longer term use of acid treatment is permissible with this process than with prior art processes.

Additionally, clogged strata admit relatively small quantities of liquid. It is decidedly advantageous to provide greater concentrations of reagents in the same volume of liquid. This can be done at a lesser acidity than is possible with the conventionally used, highly ionized acids.

The removal of oxygen from boiler feeds and the like by the use of sulfur dioxide is well known, as is the use of iron to act as a catalyst for this reaction. However, the use of iron as a catalyst in the treatment of oil-bearing strata is not known, and neither, so far as is known, is the treatment of oil well strata with water treated with sulfur dioxide in concentrations as described herein. Iron may be added for catalysis in minor amounts as a soluble iron compound or, if desired, the water may be passed over a bed of scrap iron after the injection of the sulfur dioxide. The acidity of the water will cause sufficient iron to be dissolved for the purpose.

It is a frequent phenomenon that in wells which are not in calcium-bearing strata, but instead in clays, sodium ion will react with the clay to swell the clay and plug the formation. A means of overcoming this is by means of exchanging the sodium for a calcium ion. The calcium ion can be provided in this method by adding to the treated water a calcium compound reactive with sulfurous acid to form calcium sulfite or calcium bisulfite, preferably the latter because of its greater solubility. Such a process is one method to "add calcium sulfite or bisulphite to the treated water." Another method is simply to add the compound to the treated water. (When the calcium bisulfite or sulfite reaches the sodium clay, the calcium ion is exchanged in the clay for the sodium ion, and the clay becomes flocculent, rather than packed, and permits flow of oil through the strata.)

It is noted that the molar concentration of sulfurous acid is greater at pH 6 than of the other known commonly used commercial acids, such as sulfuric or phosphoric acid at the same pH. The preferred pH value to be used will accordingly be approximately pH 6.0.

Interestingly, in calciferous fossil deposits, it will be noted that the more recently deposited calcarious material has a greater surface available for reaction with sulfurous acid and will therefore react more readily with the sulfurous acid than will the fossil deposits, which are more finely-grained. Accordingly, this acid treatment with sulfurous acid will tend to unplug fossil formations by removing the calciferous deposits which have been added therein as a consequence of operation of the well.

This invention is not to be limited to the embodiments described in the description, which are given by way of example and not of limitation, but only in accordance with the scope of the appended claims.

I claim:

1. The method of treating oil-bearing strata in oil wells comprising: treating water by absorbing in said water sulfur dioxide in excess of the stoichiometric amount needed to remove any elementary oxygen from said water, and to remove all bicarbonates and carbonates from said water, adding iron to the water as a catalyst for the removal of oxygen, and thereafter, without exposing said treated water to oxygen or to air, injecting said treated water into said strata.

2. The method of claim 1 in which a calcium compound reactive with sulfurous acid to form calcium sulfite or calcium bisulfite is added to the treated water, and sufficient additional sulfur dioxide is provided for this reaction and to provide said excess.

3. The method of claim 2 in which the calcium compound added is calcium carbonate.

4. The method of claim 1 in which calcium bisulfite or calcium sulfite is added to the treated water.

5. The method of treating oil-bearing strata in oil wells comprising: treating water by absorbing in said water sulfur dioxide in excess of the stoichiometric amount needed to remove any elementary oxygen from said water, and to remove all bicarbonates and carbonates from said water, adding to the treated water a calcium compound reactive with sulfurous acid to form calcium sulfite or calcium bisulfite, together with sufficient sulfur dioxide for said reaction and to provide said excess, and thereafter, without exposing said treated water to oxygen or to air, injecting said treated water into said strata.

6. The method of claim 5 in which the calcium compound added is calcium carbonate.

7. The method of treating oil-bearing strata in oil wells comprising: treating water by absorbing in said water sulfur dioxide in excess of the stoichiometric amount needed to remove any elementary oxygen from said water, and to remove all bicarbonates and carbonates from said water, adding calcium bisulfite or calcium sulfite to the treated water, and thereafter, without exposing said treated water to oxygen or to air, injecting said treated water into said strata.

* * * * *